United States Patent [19]
Wuu et al.

[11] Patent Number: 5,600,745
[45] Date of Patent: Feb. 4, 1997

[54] METHOD OF AUTOMATICALLY COUPLING BETWEEN A FIBER AND AN OPTICAL WAVEGUIDE

[75] Inventors: Dong-Sing Wuu; Hong-Ming Chen, both of Hsinchu; Tzung-Rue Hsieh; Hsiang-Chen Hsu, both of Hsinchu Hsien; Ten-Hsing Jaw, Hsinchu, all of Taiwan

[73] Assignee: Industrial Technology Research Institute, Hsinchu, Taiwan

[21] Appl. No.: 598,660

[22] Filed: Feb. 8, 1996

[51] Int. Cl.$^6$ .................. G02B 6/00; G02B 6/34
[52] U.S. Cl. .................................................. 385/49
[58] Field of Search ................. 385/49, 88, 129, 385/130, 131, 132, 147

[56] References Cited

U.S. PATENT DOCUMENTS

| | | | |
|---|---|---|---|
| 4,735,677 | 4/1988 | Kawachi et al. | 156/633.1 |
| 4,750,799 | 6/1988 | Kawachi et al. | 385/48 |
| 5,420,688 | 5/1995 | Farah | 250/227.27 |

Primary Examiner—Akm E. Ullah
Attorney, Agent, or Firm—Ladas & Parry

[57] ABSTRACT

A method of automatically coupling between a fiber and an optical waveguide is disclosed. Such a scheme is achieved by the property of the different etching rate in the various wafer direction on a semiconductor material, especial silicon, and the shrinking property of the glass soot formed by a flame hydrolysis deposition technique during a high temperature consolidation process, for improving aligning accuracy. The manufacturing process of the method is described below. First, a waveguide buffer layer is formed on a semiconductor substrate, then a waveguide layer is formed on the semiconductor substrate and the waveguide buffer layer. A part of the waveguide is manipulated to the planar optical waveguide, meanwhile, several windows which lead to the I/O end of the planar waveguide are formed on the other waveguide layer. The semiconductor substrate beneath the windows is etched anisotropically to form several aligning grooves. The lateral faces of these grooves and the surface of the semiconductor substrate can constitute a fixed angle.

14 Claims, 8 Drawing Sheets

METHOD OF AUTOMATICALLY COUPLING BETWEEN A FIBER AND AN OPTICAL WAVEGUIDE

BACKGROUND OF THE INVENTION

1. Field of the Invention

The present invention in general relates to a manufacturing method for improving optical coupling characteristic. More specifically, the present invention relates to a manufacturing method of automatically coupling between a fiber and an optical waveguide, which can promote the coupling efficiency between the fiber and the optical waveguide by controlling accurately the width and the depth of grooves for supporting the fiber. Alternatively, such a process also reveals high reproducibility.

2. Description of Related Art

Figure 1:
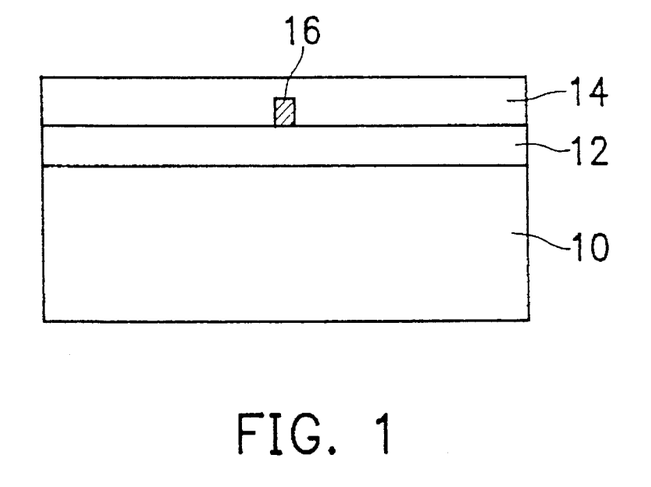
FIG. 1 (Prior Art) is a cross-sectional view of the conventional optical waveguide chip.

Optical waveguide chips, which are planar optical circuits consisting of optical waveguides, are fabricated on a silicon chip and mostly utilized in optical fiber communication and other related optical systems. FIG. 1 shows the construction of a conventional general optical waveguide chip. Numeral 10 is a silicon substrate and a waveguide 16 is sandwiched between a waveguide buffer layer 12 and a waveguide cladding 14. Generally, the width and height of the waveguide are about 8 µm; the thickness of the waveguide buffer layer, about 20 µm; and the thickness of the waveguide cladding, about 20–30 µm. Both end faces of waveguide 16 that can perform a specific function must be coupled to a fiber in order to connect to external optical circuits or devices. Common waveguides are usually fabricated from high-silica glass because such a waveguide displays low loss in lightwave transmission and in coupling due to the mode field of the high-silica waveguide being similar to that of the commercial single-mode fiber. On the other hand, the interface between the high-silica glass and the silicon substrate displays excellent chemical bonding capability.

Figure 2:
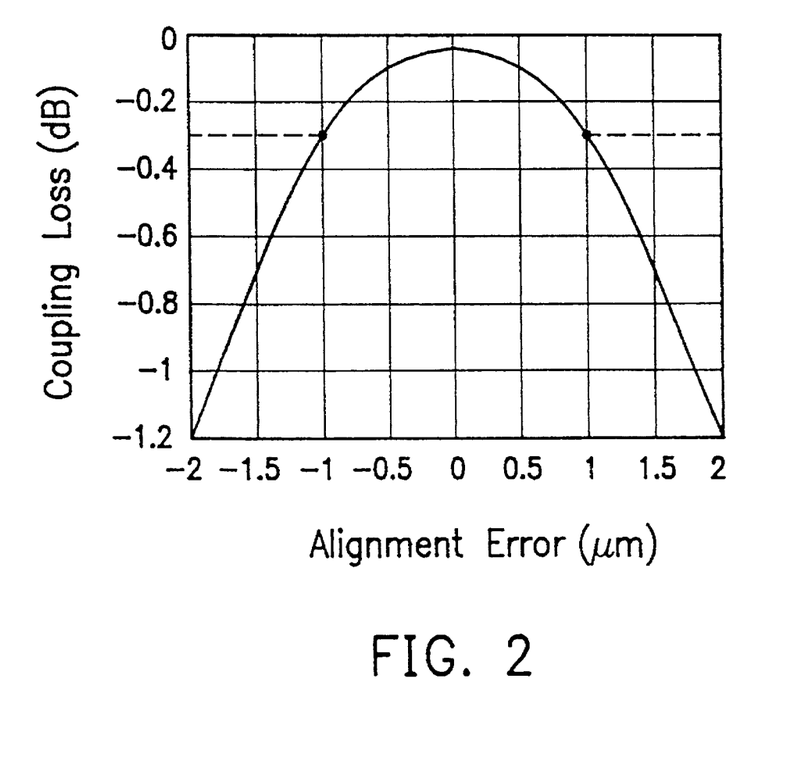
FIG. 2 is a relationship diagram of the alignment error and the coupling loss while coupling between a single-mode fiber and an optical waveguide, wherein the core radius of the single-mode fiber is 9 μm and the difference of the refraction index 0.25%, the width and height of the optical waveguide are all 8 μm, the difference of the refraction index 0.3%.

Therefore, how to accurately couple the end faces of the waveguide in a waveguide chip to a fiber linking with external optical devices and reduce the coupling loss is a very critical issue. The main approach adopted now is to arrange the fiber in an aligning groove prepared by etching technique so that the core of the fiber will finely tune to the geometric center of the corresponding waveguide. The accuracy and precision of aligning the fiber with the waveguide will affect the optical coupling loss resulting from misalignment between both. FIG. 2 is a relationship diagram of the alignment error and the coupling loss while coupling between a single-mode fiber and an optical waveguide, where the core radius of the single-mode fiber is 9 µm and the difference of the refraction index 0.25%, the width and height of the optical waveguide are all 8 µm, the difference of the refraction index 0.3%. The coupling loss of 0.3 dB can be considered reasonable while the alignment error is about ±1 µm. However, it is almost impossible to achieve such a tolerance requirement by the above-mentioned conventional fabrication process, especially when making aligning grooves by reactive ionic etching (RIE) that can not precisely control the depth of the grooves.

The conventional aligning technique can fundamentally be divided into two approaches. The first approach is called static alignment, which is characterized in that the requirement of alignment for the fiber and the corresponding waveguide is achieved when the alignment groove finishes. This type of alignment approach, like the above-mentioned aligning technique, is quite straight and known as a best method of optical coupling currently. U.S. Pat. No. 5,297,228 discloses a static alignment method of optical coupling. In the '228 patent, an end face of a waveguide chip is abutted against an end face of a fiber aligning jig on which optical fiber are arranged. At least one marker is formed in each of the waveguide chip and the fiber aligning jig, and also at least one pin guide groove is formed in each of the waveguide chip and the fiber aligning jig, using the marker as a reference mark. The planar optical waveguide and the optical fiber are aligned with each other by means of a common guide pin laid along the corresponding pin guide grooves. The above-mentioned grooves are usually formed by a dicing saw. However, the performance of the dicing saw may be seriously degraded due to long-term operations and then such a circumstance will affect accuracy of width and depth of the cutted grooves and increase the coupling loss.

The second approach called active alignment is apparently different from static alignment. Aligning in active alignment is made by measuring the optical characteristics between the fiber and the waveguide and adjusting their relative positions, for example, disclosed in U.S. Pat. No. 5,175,781. Using a laser ablation system, predetermined positions for aligning grooves can be formed in the wafer. Fine dynamic adjustment of the predetermined positions can be made by the above-mentioned measuring and adjusting process. The chief disadvantage of this aligning method is that it is difficult to control the vertical depth of the aligning groove. On the other hand, in practice, it is hard to be implemented so as to increase the manufacture cost and reduce the efficiency of production.

Another approach that utilizes dry etching to cut off the desired aligning grooves had been disclosed in Journal of Lightwave Technology LT-5, No. 12, P1716(1987). However, with such a scheme, it is difficult to maintain the required accuracy in depth, especially using reactive-ion etching (RIE).

SUMMARY OF THE INVENTION

Under such circumstances described above, the first object of the present invention is to provide a method of automatically coupling a fiber and an optical waveguide, which can promote the accuracy and the precision of alignment in the vertical direction in order to reduce the coupling loss.

The second object of the present invention is to provide an alignment method that can effectively increase the product reliability and promote the reproducibility of the manufacturing process.

In view of the above-mentioned objects, the present invention provides a method of automatically coupling between a fiber and an optical waveguide, for coupling the optical waveguide on a planar optical circuit of a semiconductor substrate to the fiber used as an input/output port of the planar optical circuit. The method comprises the steps of: forming a buffer layer on the semiconductor substrate; forming a waveguide layer on the waveguide buffer layer; fabricating the optical waveguide from the waveguide layer and a window abutted to an end of the optical waveguide in the waveguide layer; anisotropically etching the semiconductor substrate under the window to form an aligning groove, wherein there is a predetermined angle between the lateral faces of the aligning groove and the semiconductor substrate; forming a cladding layer covering the optical waveguide by flame hydrolysis deposition technique and consolidation process, wherein there is a spacing between the cladding layer and the semiconductor substrate at the groove; removing the cladding layer over the aligning groove; and placing the fiber on the aligning groove, which can automatically align with the optical waveguide by the predetermined angle of the aligning groove.

BRIEF DESCRIPTION OF THE DRAWINGS

A detailed description of an embodiment of the present invention is made with reference to the accompanying drawings, wherein.

DETAILED DESCRIPTION OF THE PREFERRED EMBODIMENTS

The characteristic of etching in different directions on a silicon wafer and of consolidating the glass formed by the flame hydrolysis deposition technique is applied for improving accuracy of coupling between the fiber and the optical waveguide in this embodiment.

For a general semiconductor material, such as silicon, there are different chemical features in different directions due to the lattice structure. The silicon wafer, for example, in the (100), (110), (111) directions has increasingly denser atomic density.

For an orientation-dependent etchant, such as a mixture of 23.4 wt. % KOH, 13.3 wt. % isopropyl alcohol (IPA), and 63 wt. % $H_2O$, ratio of the etching rates in the (111), (110), and (100) directions of the silicon wafer is 1:16:100.

Figure 3:
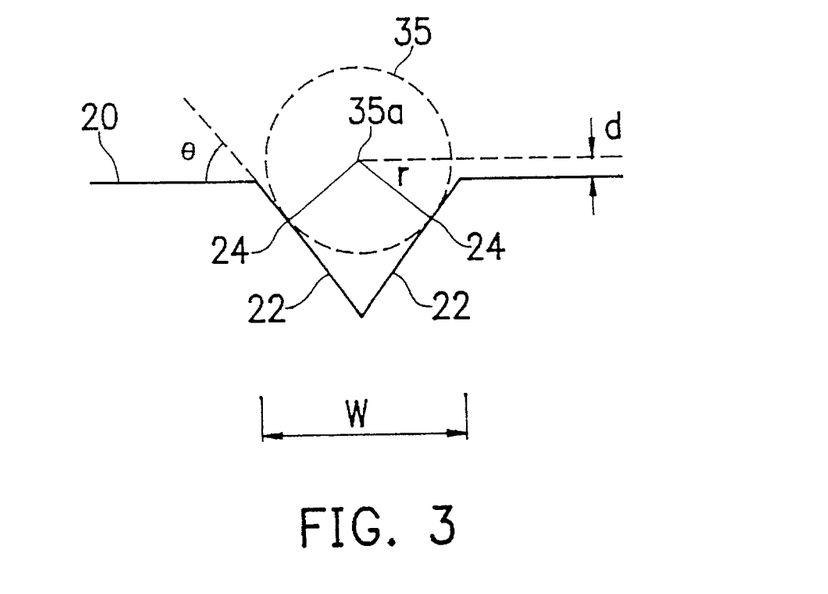
FIG. 3 is a geometrical graph of the V-groove formed on the silicon substrate along the (100) plane.

According to the above descriptions, etching a specific window of the silicon wafer in the (100) direction by the orientation-dependent etchant will result in a V-shaped or U-shaped groove under the specific window. Refer to FIG. 3, which schematically shows a V-shaped groove on a silicon substrate by such a process. The silicon substrate is in the (100) direction and the lateral face 22 of the V-shaped groove is in the (111) direction. Based on the geometrical relationship in a lattice, the intersectional angle θ between silicon substrate 10 and lateral face 22 is 54.74°, independent of the width w of the windows on the top of the V-shaped groove. When a fiber 35 with the radius r is located on the V-shaped groove, fiber 35 will be in contact with lateral faces 22 at two tangent points 24. If the radius r of fiber 35 is not large, tangent points 24 will reside within lateral faces 22, as shown in FIG. 3; if the radius r is larger than a certain value, fiber 35 will be clamped at the corners of the groove. When fiber 35 is arranged at the tangent points 24, the vertical distance d from the center 35a of fiber 35 to substrate 20 can be expressed as:

$$d = \frac{r}{\cos \theta} - \frac{w}{2 \cot \theta} \qquad (1)$$

Figure 4:
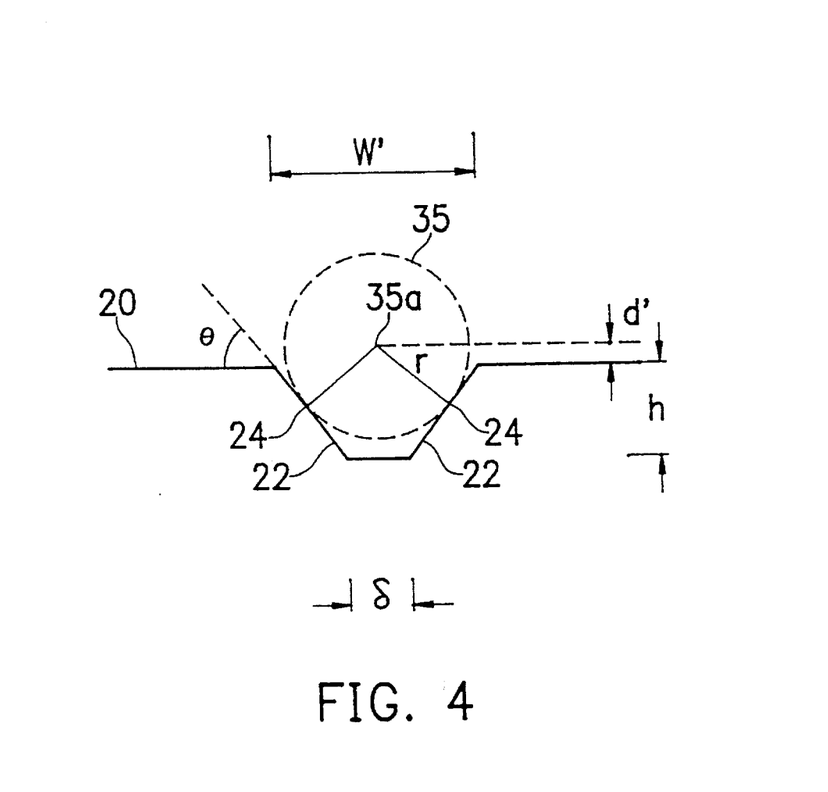
FIG. 4 is a geometrical graph of the U-groove formed on the silicon substrate along the (100) plane.

FIG. 4 schematically shows a sectional view of a U-shaped groove formed in the silicon substrate. The geometrical structure shown in FIG. 4 is quite similar to that of FIG. 3, except that the bottom of lateral faces 22 is cut to form a bottom plane 26. Same as Equ. (1), the vertical distance d' from the center of the fiber to substrate 20 is expressed as:

$$d' = \frac{r}{\cos \theta} - \frac{w'}{2 \cos \theta} \qquad (2)$$

wherein w' represents the width of the window in the U-shaped groove. Alternatively, the width w', in the case of U-shaped groove, can also be expressed by the width d of the bottom plane 26 and the vertical depth h of the groove as:

$$w' = \delta + 2h \cot \theta \qquad (3)$$

In the conventional film process, depositing silica glass on a silicon substrate is always made by chemical vapor deposition, such as low-pressure CVD and plasma-enhanced CVD, the E-Gun process, RF sputtering or some other technique. However, there are two drawbacks to applying these techniques to optical waveguide chip processes. First, the deposition speed of these conventional techniques is relatively slow, especially for forming a thick waveguide cladding or buffer layer. Such a feature will degrade the manufacture efficiency. Secondly, in the conventional film processes, the geometrical structure of the waveguide cladding is difficult to control, resulting in pin holes due to shadow effect. It also affords insufficient protection for waveguides. Therefore, the flame hydrolysis deposition technique, originally applied to produce waveguide preforms, is widely used in optical waveguide chip processes.

The chemical reaction formula in flame hydrolysis deposition process is as follows:

$$SiCl_4 + 2H_2O \rightarrow SiO_2 + 4HCl \qquad (4)$$

The process for fabricating silica glass on a silicon wafer is to arrange silicon tetrachloride ($SiCl_4$) over the flame generated by burning oxygen gas and hydrogen gas, and then to produce grained glass powder of silicon-oxygen composition by reacting. Such a product is sprinkled on the silicon wafer by a rotational circular disk and then form a glass soot layer that uniformly deposits on the silicon wafer. Thus, the glass soot can be sinitered at high temperature and shrink as the required silica glass. The thickness of the silica glass can be readily controlled in the flame hydrolysis deposition process using the deposition parameters of this process. The shrinking ratio is generally about 20:1. On the other hand, some compositions, such as $BBr_3/BCl_3$ and $PCl_3/POCl_3$, can be added to decrease the consolidating temperature so as to prevent the melting of the silicon wafer.

Figure 5:
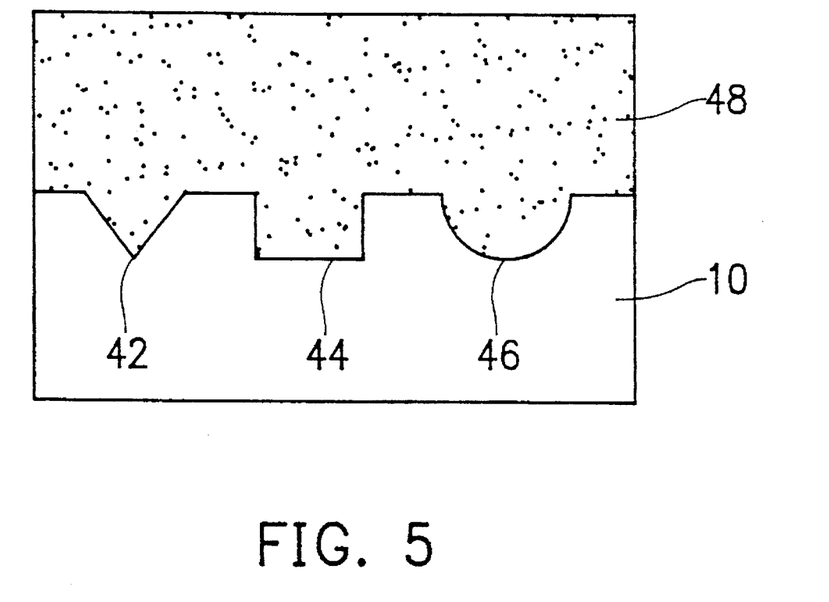
FIG. 5 is a cross-sectional view of the substrate having grooves filled with a glass soot by a flame hydrolysis deposition process.
Figure 6:
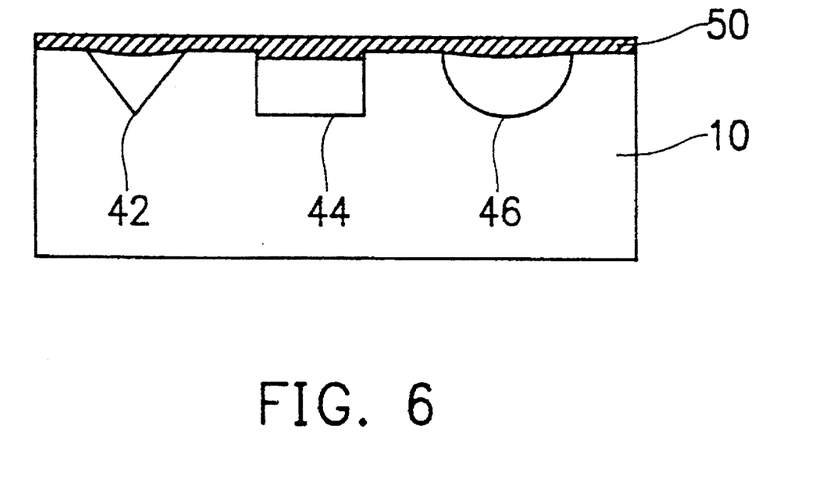
FIG. 6 is a cross-sectional view of the construction shown in FIG. 5 after consolidation.

The glass soot is deposited onto the groove of the silicon substrate itself and consolidated by high-temperature process as shown in FIG. 5 and FIG. 6. In FIG. 5, glass soot 48 is deposited onto silicon substrate 10, which has grooves 42, 44, 46 of different shape, and formed by flame hydrolysis deposition technique. If the width of grooves 42, 44, 46 is narrow enough, glass soot 48, by the high-temperature consolidation process, will shrink and be formed as glass layer 50, shown in FIG. 6, and a spacing is present therebetween. Such a phenomenon results from the cohesive force during shrinking in the consolidation step. Meanwhile, the cohesive force must be greater than the gravitational force of glass soot 48 and then the construction depicted as FIG. 6 can be formed. Therefore, in the consolidation step, glass soot 48 formed in the groove with broader width will still shrink as a buried glass layer.

In the preferred embodiment of the present invention, we choose a V-shaped groove as the automatic aligned groove between the fiber and the waveguide. Those skilled in the art can readily use grooves with other shape, such as U-shaped one, to acquire equivalent results. The fiber is 9/125 single mode one, which has 125 μm in diameter of the cladding and 9 μm in diameter of the core, with the refraction index difference 0.25% therebetween. The waveguide is a rectangular one with 8 μm in width and height and 0.3% in the refraction index difference. The detailed processes are described as shown in FIG. 7 to FIG. 10.

Figure 7A:
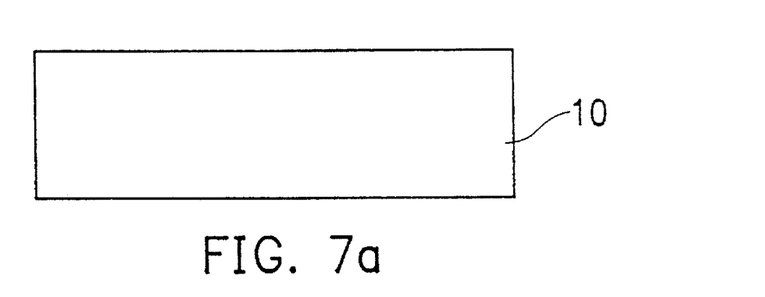
FIG. 7(a)–7(d), 8(a)–8(d) and 9(a)–9(c) are cross-sectional views showing the method of automatically coupling between the fiber and the optical waveguide in this embodiment of the present invention.
Figure 7B:
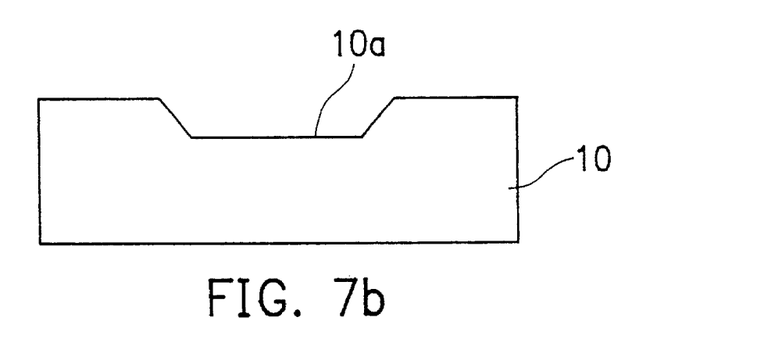
Figure 7C:
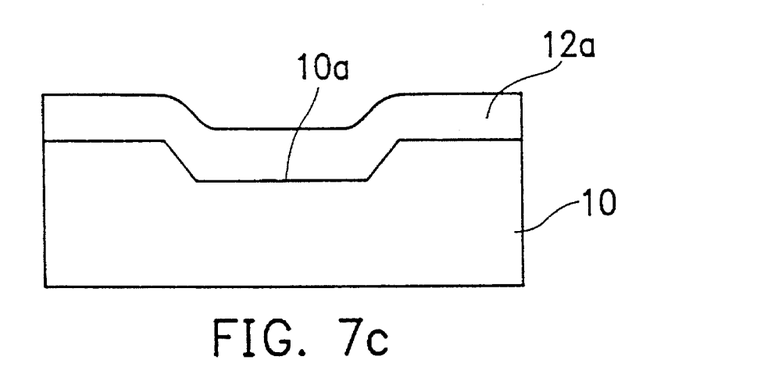
Figure 7D:
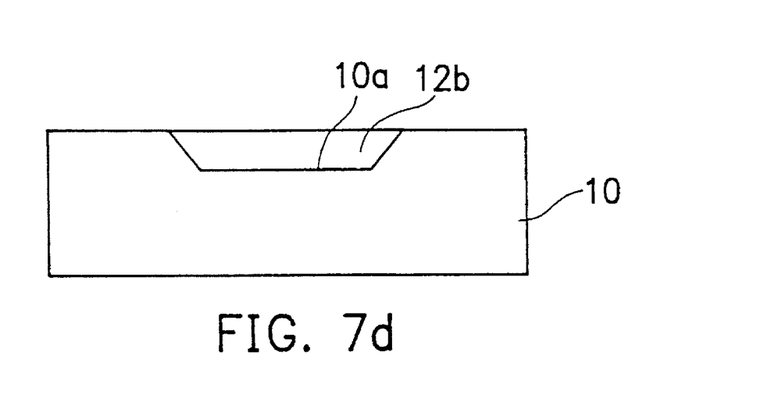

Now turning to FIG. 7, a buried buffer layer 12b, which is used as a basis for fabricating optical circuitry, will be formed onto the semiconductor substrate 10. Those skilled in the art can readily grasp that the other fabrication processes can be used to build the required buffer layer. In FIG. 7a, a silicon wafer 10, four inches in diameter and (100) in the orientation direction, is supplied as the substrate. In FIG. 7b, a flat-formed groove 10a, about 22–25 μm in depth, can be built in the silicon wafer 10, by typical anisotropical etchant, for example, a mixture of 44 g KOH plus 100 ml DI at 85° C. In FIG. 7c, in the interior of the groove 10a and the whole silicon wafer 10, a glass soot about 500 μm can be deposited by the flame hydrolysis deposition process, according to the following conditions:

$H_2$: 10.5 l/min, $O_2$: 21 l/min,

Ar: 500 cc/min, $SiCl_4$: 500 cc/min, $BBr_3$: 200 cc/min, and $POCl_3$: 60 cc/min.

Such a construction is displaced on the heating oven (at about 1210° C.) to be shrunk as glass layer 12a. The thickness of glass layer 12a, according to the shrinkage ratio of 20:1, is about 25 μm. Finally, in FIG. 7d, glass layer 12a is polished until the outer surface of the silicon substrate 10 is exposed and the remaining glass layer 12a in the interior of the flat-formed groove 10a constitutes the buffer layer 12b. Because the buffer layer is at least 20 μm or more, its tolerance of error, in the polishing process of the preferred embodiment, can be as much as ±5 μm. The advantage of the buried buffer layer is that, using the surface of the silicon wafer 10 as a horizontal aligning plane, the thickness of the subsequent forming layers can be easily controlled. Therefore, the required planar optical circuit can be formed on the buffer layer 12b and the aligned groove, formed in the following steps, can be produced in the exposing silicon wafer 10. However, a conventional buffer layer, other than the buried buffer layer shown in FIG. 7, also can be used in the embodiment of the present invention.

Figure 8A:
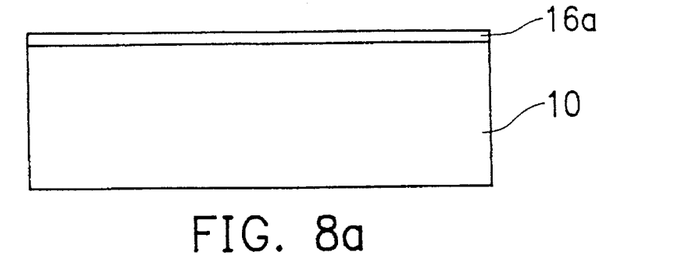
Figure 8B:
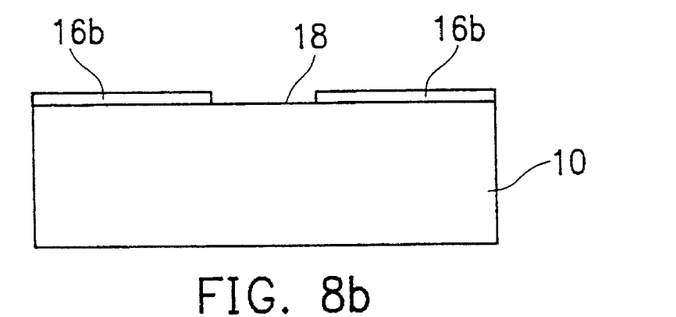
Figure 8C:
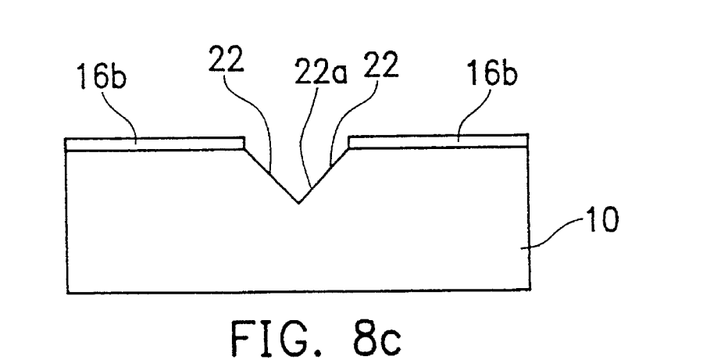
Figure 8D:
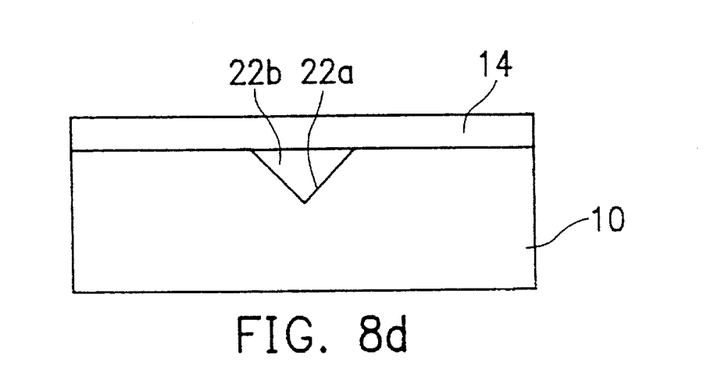
Figure 9A:
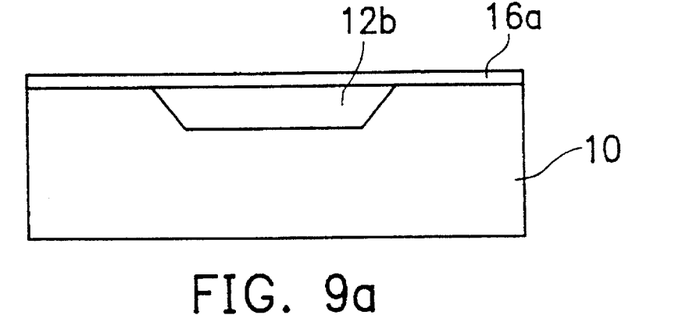

Refer now to FIG. 8 and FIG. 9. FIG. 8 is a cross-sectional view of the exposed area of the silicon wafer, illustrating the fabrication process of the aligned groove, and FIG. 9 is a cross-sectional view of the area of the buried buffer layer, illustrating the fabrication process of the optical circuitry. In this preferred embodiment, the optical circuitry, for simplicity, only comprises a straight waveguide. At first, a waveguide layer 16a can be formed in the exposing silicon wafer 10, as shown in FIG. 8a, and the buffer layer 12b, as shown in FIG. 9a, by the flame hydrolysis deposition technique and high temperature consolidation, or other known methods. The thickness of the waveguide layer 16a must be maintained at 8 μm, while the error tolerance of the thickness is ±0.3 μm and the refraction index difference compared with the buffer layer 12b is 0.3%.

Figure 9B:
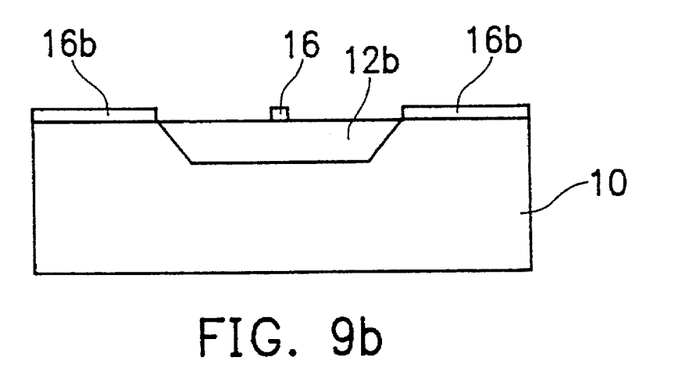

As shown in FIG. 9b, etching the waveguide layer 16a by some known lithographic and etching method, waveguide 16 can be formed onto the buffer layer 12b, meanwhile, as shown in FIG. 8b, a window 18 in line with the end faces of the waveguide 16 can be formed in the exposed silicon wafer 10 in the same manner. The width of the waveguide 16 is 8 μm in the ±0.3 μm tolerance range of error. The width of the window 18 is 146 μm±0.3 μm.

Next, as shown in FIG. 8c, using some anisotropical etchant (for example, the above-mentioned mixture of KOH plus DI), the exposing silicon wafer 10 can be etched through the window 18. Therefore, a V-shaped groove 22a will appear in the surface of the silicon wafer 10, resulting from the anisotropical etching property in the (100) direction of the silicon wafer 10, and the orientation of both etching stop lateral faces 22 is in the (111) direction. The width of the V-shaped groove 22a is 147.5 μm±0.5 μm.

Figure 9C:
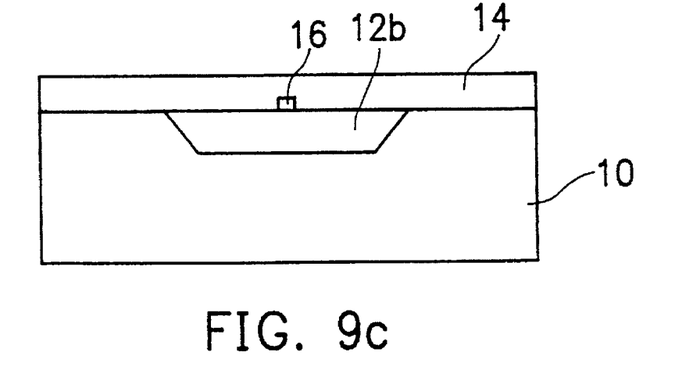

Then, by the flame hydrolysis deposition and high temperature consolidation process, a cladding layer 14 is deposited over the waveguide 16 to fulfill the construction of the optical circuitry, as shown in FIG. 9c, meanwhile, a spacing 22b, resulting from cohesive force of glass soot during shrinking, is produced between the cladding layer 14 and silicon wafer 10. The thickness of the cladding layer 14 is about 20 μm and its refraction index difference compared with waveguide 16 is about 0.3%.

Figure 10A:
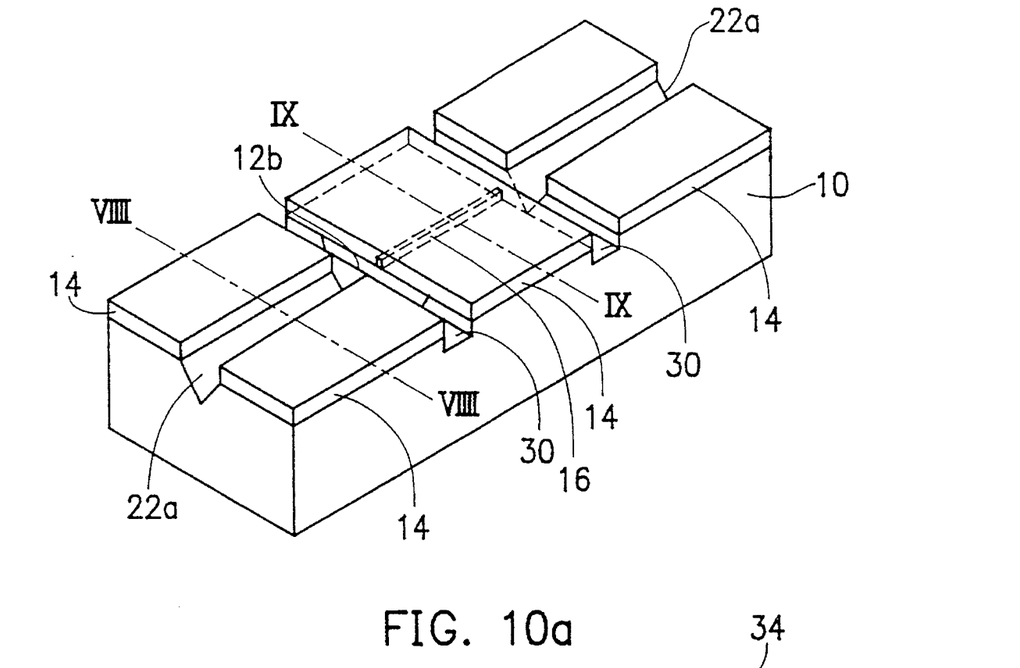
FIGS. 10(a) and 10(b) are a perspective view.
Figure 10B:
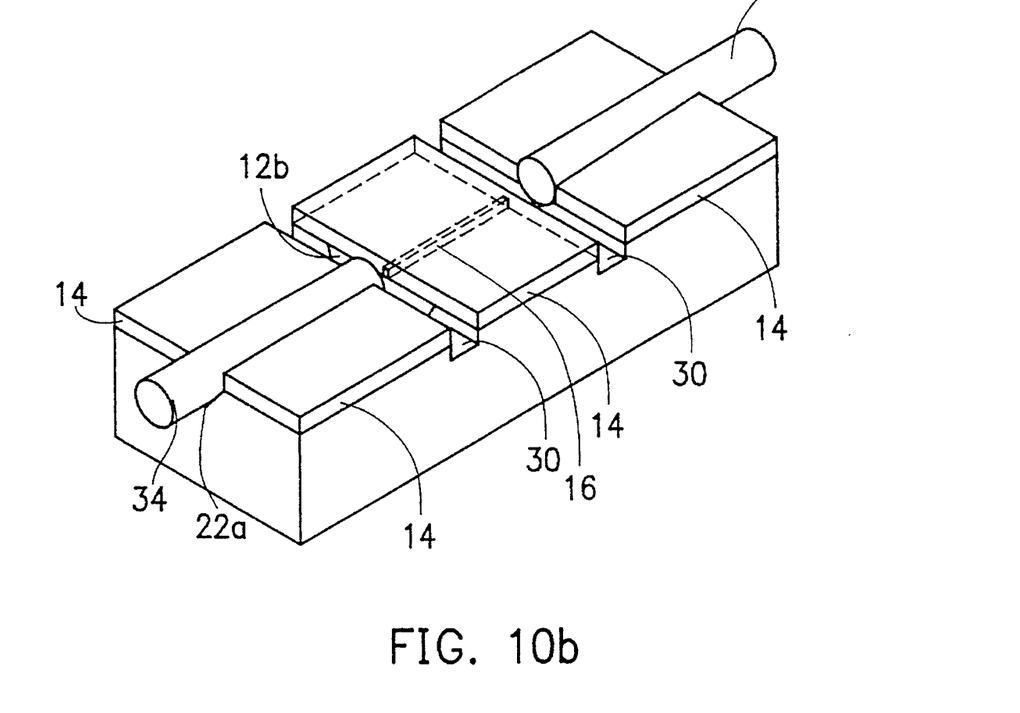

In final step, the part of the cladding layer 14 located over the V-shaped groove 22a must be removed. FIG. 10 is a perspective view showing the removing step. In this preferred embodiment of the present invention, we choose a dicing saw (not shown) to perform this removing process, however, those skilled in the art can readily appreciate that the other cutting methods can be used. The dicing saw is usually round. If the round dicing saw is directly used to cut buffer layer 14 over the V-shaped groove 22a, the front rim of the round dicing saw may cause the end faces of waveguide 16 to be damaged. Therefore, in this embodiment, we will at first operate the dicing saw to form two auxiliary grooves 30, which are perpendicular to the end faces of the waveguide 16 and are 1 mm in width. Both of the auxiliary grooves 30 can be used to protect the end faces of the waveguide 16 from being cut by the front rim of the round dicing saw. Then, cladding layer 14 over the V-shaped groove 22a is removed by the dicing saw, as shown in FIG. 10a. In FIG. 10a, line VIII—VIII represents the cross-sectional view shown in FIG. 8 and line IX—IX represents the cross-sectional view shown in FIG. 9. Finally, we can fix fibers 34 into the V-shaped grooves 22a and stick them to the end faces of waveguide 16, as shown in FIG. 10b. Therefore, automatic alignment between the 9/125 single mode fiber 34 and the 8×8 μm waveguide 16 is complete.

The mechanism of automatic alignment principally results from the geometrical construction of the V-shaped groove. When a fiber is placed into the V-shaped groove as described in this embodiment, the center of the fiber will be vertically far from the surface of the silicon substrate in distance d, which can be determined by Equation (1) and related to the radius r (62.5μ), the angle θ (54.74°) and the width W. If the fiber can be automatically aligned with an 8×8 μm waveguide, the distance d must be half the height of the waveguide, that is, about 4 μm. Meanwhile, the width w required to meet such a situation can be calculated as 147.43 μm, which is almost same as the amount adopted in this embodiment. From the view of error controlling, when the variance of the width w is ±1 μm, the error of the distance d will be in the range of ±0.7 μm, which is acceptable. Therefore, automatic alignment in a vertical direction can be truly achieved. On the other hand, alignment in the horizontal direction also can be achieved by a lithographic and etching process.

When the fiber is placed into the V-shaped groove, the supporting point for the fiber normally will reside in the etch stop faces of the groove, rather than the top corners. Therefore, even if the top corners are damaged in the process of cutting the cladding layer over the V-shaped groove, the accuracy of alignment can still be achieved unless that the groove in the position of the supporting point is corrupt. Such a situation may happen when the dicing saw is degraded due to long service time. It also assures that reliability of the product and repeatability of the alignment process can be easily obtained.

In this embodiment, a U-shaped groove can be equivalently substituted for the V-shaped groove. The mechanism of automatic alignment relating to the U-shaped groove can be ruled by formula.(2). The difference between them is that U-shaped grooves have flat base but V-shaped ones do not. In order to prevent contact between the supported fiber and the flat base of the U-shaped groove, the radius of the fiber should be restricted as:

$$r < d' + h \quad (5)$$

wherein d' is the vertical distance between the surface of the silicon substrate and the center of the fiber; h is the vertical height of the groove. It means that the radius r must be less than the sum of the vertical distance d' and the vertical height h.

Figure 11:
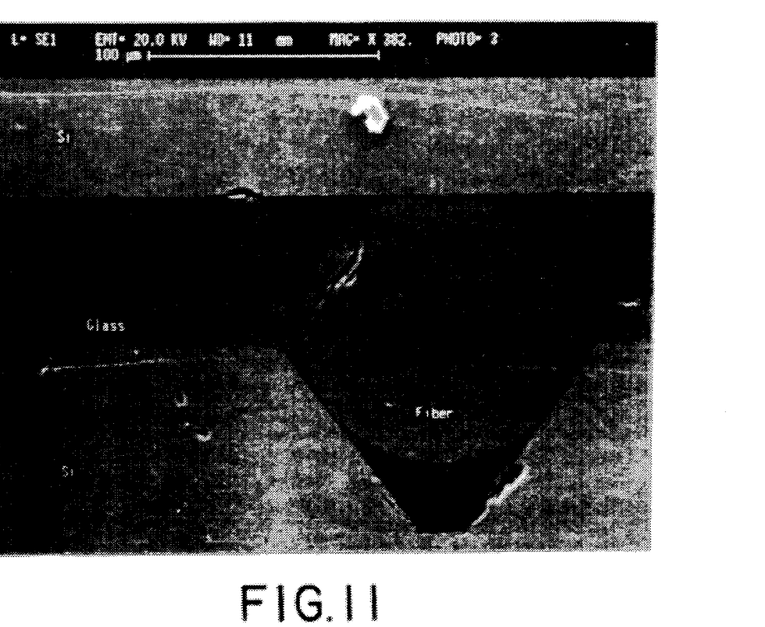
FIG. 11 and FIG. 12 are enlarged photographs showing the experimental results with enlargement ratios of ×382 and ×112, respectively.
Figure 12:
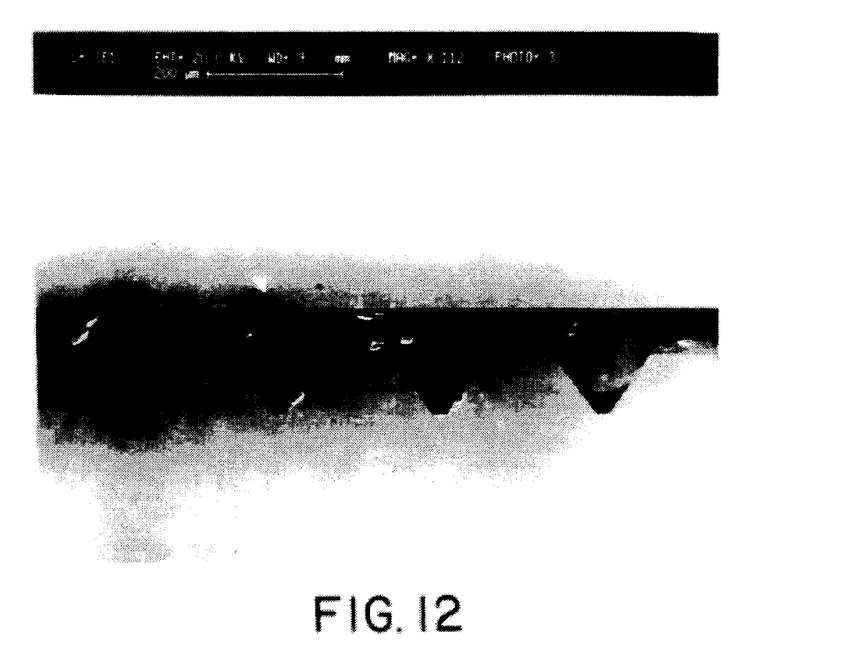

We have made experiments to verify our alignment approach. The results are shown in FIG. 11 and FIG. 12. FIG. 11 is an enlarged photograph with the an enlargement ratio of 382. It reveals that even if the V-shaped groove (shown in the left lower part) reassembles to a U-shaped one due to incomplete etching and the construction of the top corners is damaged due to misalignment during cutting the cladding layer, the fiber (shown in the left middle part) still can be precisely positioned. FIG. 12 is an enlarged photograph with an enlargement ratio of 112. Four alignment grooves (shown in the lower part) that are slightly different from each other can precisely position four corresponding fibers, respectively. This demonstrates the reproducibility of the present invention. After quantitative measurement, the error of alignment between the fiber and the corresponding waveguide is below ±1 μm and the coupling loss is below 0.3 dB. Coupling efficiency can be obtained in the present invention, compared with the conventional alignment process, in which the error is about ±2 μm and the coupling loss about 0.6 dB.

Advantages of the present invention are described as follows:

1. Accuracy of alignment process between a predetermined fiber and a waveguide can be precisely controlled, especially in the vertical direction, due to the anisotropically etching silicon wafer. Geometrical construction of the groove formed by anisotropic etching process is directly related to the etching window. The following cladding layer deposited later can be easily removed due to its shrinking characteristics during sintering.

2. The fabrication process disclosed in the embodiment is highly reproducible. For critical precision, the buffer layer must be polished, the alignment groove etched, and the cladding layer over the alignment groove removed. Reliability of the product is enhanced and the cost reduced.

What is claimed is:

1. A method of automatically coupling between a fiber and an optical waveguide, for coupling the optical waveguide on a planar optical circuit of a semiconductor substrate to the fiber used as an input/output port of said planar optical circuit, said method comprising the steps of:

forming a buffer layer on said semiconductor substrate;

forming a waveguide layer on said waveguide buffer layer;

fabricating said optical waveguide from said waveguide layer and a window abutted to an end of said optical waveguide in said waveguide layer;

anisotropically etching said semiconductor substrate under said window to form an aligning groove, wherein there is a predetermined angle between lateral faces of said aligning groove and said semiconductor substrate;

forming a cladding layer covering said optical waveguide by flame hydrolysis deposition technique and consolidation process, wherein there is a spacing between said cladding layer and said semiconductor substrate at said aligning groove;

removing said cladding layer over said aligning groove; and placing said fiber on said aligning groove, which can automatically align with said optical waveguide by said predetermined angle of said aligning groove.

2. A method of claim 1, wherein said aligning groove is formed as a V-shaped groove.

3. A method of claim 1, wherein said aligning groove is formed as a U-shaped groove.

4. A method of claim 1, wherein the step of forming said buffer layer further comprises the steps of:

anisotropically etching said semiconductor substrate to form a flat-formed groove on said semiconductor substrate;

forming a glass layer on said semiconductor substrate; and polishing said glass layer to the level of said semiconductor substrate and said glass layer inside said flat-formed groove being said buffer layer.

5. A method of claim 4, wherein said glass layer is formed by the flame hydrolysis deposition technique and consolidation process.

6. A method of claim 1, wherein said waveguide layer is formed by the flame hydrolysis deposition technique and consolidation process.

7. A method of claim 1, wherein the refractive index change exists between said waveguide layer and said buffer layer.

8. A method of claim 1, wherein the step of fabricating said optical waveguide and said window is achieved by a lithographic and etching process to precisely control their position and size.

9. A method of claim 1, wherein the step of removing said cladding layer further comprises the steps of:

forming an auxiliary groove perpendicular to said optical waveguide and adjacent to the end of said optical waveguide by a dicing saw; and removing said cladding layer toward said auxiliary groove.

10. A method of automatically coupling between a fiber and an optical waveguide for coupling the optical waveguide on a planar optical circuit of a silicon substrate to a single-mode fiber, wherein the orientation of said silicon substrate is in (100) direction, said method comprising the steps of:

forming a flat-formed groove on said silicon substrate to define the position of said planar optical circuit;

forming a glass layer on said silicon substrate;

polishing said glass layer to said silicon substrate, which can serve as a buffer layer;

forming a waveguide layer on said buffer layer;

fabricating said optical waveguide from said waveguide layer and a window abutted to said optical waveguide in said waveguide layer;

anisotropically etching the silicon substrate under said window to form an aligning groove, wherein the orientation of lateral faces of said aligning groove is in the (111) direction and the depth of said aligning groove plus half the height of said optical waveguide must be larger than the radius of said single-mode fiber;

forming a cladding layer covering said optical waveguide by flame hydrolysis deposition technique and consolidation process, wherein there is a spacing between said cladding layer and the silicon substrate at said aligning groove;

forming an auxiliary groove perpendicular to said optical waveguide and adjacent to the end of said optical waveguide by a dicing saw;

removing said cladding layer toward said auxiliary groove; and placing said single-mode fiber on the aligning groove, wherein the vertical distance between a center of said single-mode fiber and said silicon substrate is equal to half the height of said optical waveguide.

11. A method of claim 10, wherein said aligning groove is a V-shaped groove.

12. A method of claim 11, wherein the vertical distance d between the center of said single-mode fiber and said silicon substrate can be expressed as:

$$d = \frac{r}{\cos \theta} - \frac{w}{2 \cot \theta}$$

wherein r expresses the radius of said single-mode fiber, w the top width of the V-shaped groove, and θ an intersectional angle of the (100) direction and the (111) direction in the silicon substrate.

13. A method of claim 10, wherein said aligning groove is a U-shaped groove.

14. A method of claim 13, wherein the vertical distance d' between the center of said single-mode fiber and said silicon substrate can be expressed as:

$$d' = \frac{r}{\cos \theta} - \frac{w'}{2 \cot \theta}$$

wherein r expresses the radius of said single-mode fiber, w' the top width of the U-shaped groove and θ an intersectional angle of the (100) direction and the (111) direction in the silicon substrate.

\* \* \* \* \*